E. S. BRYANT.
REVERSIBLE PROPELLER.
APPLICATION FILED MAY 25, 1908.
961,285.
Patented June 14, 1910.
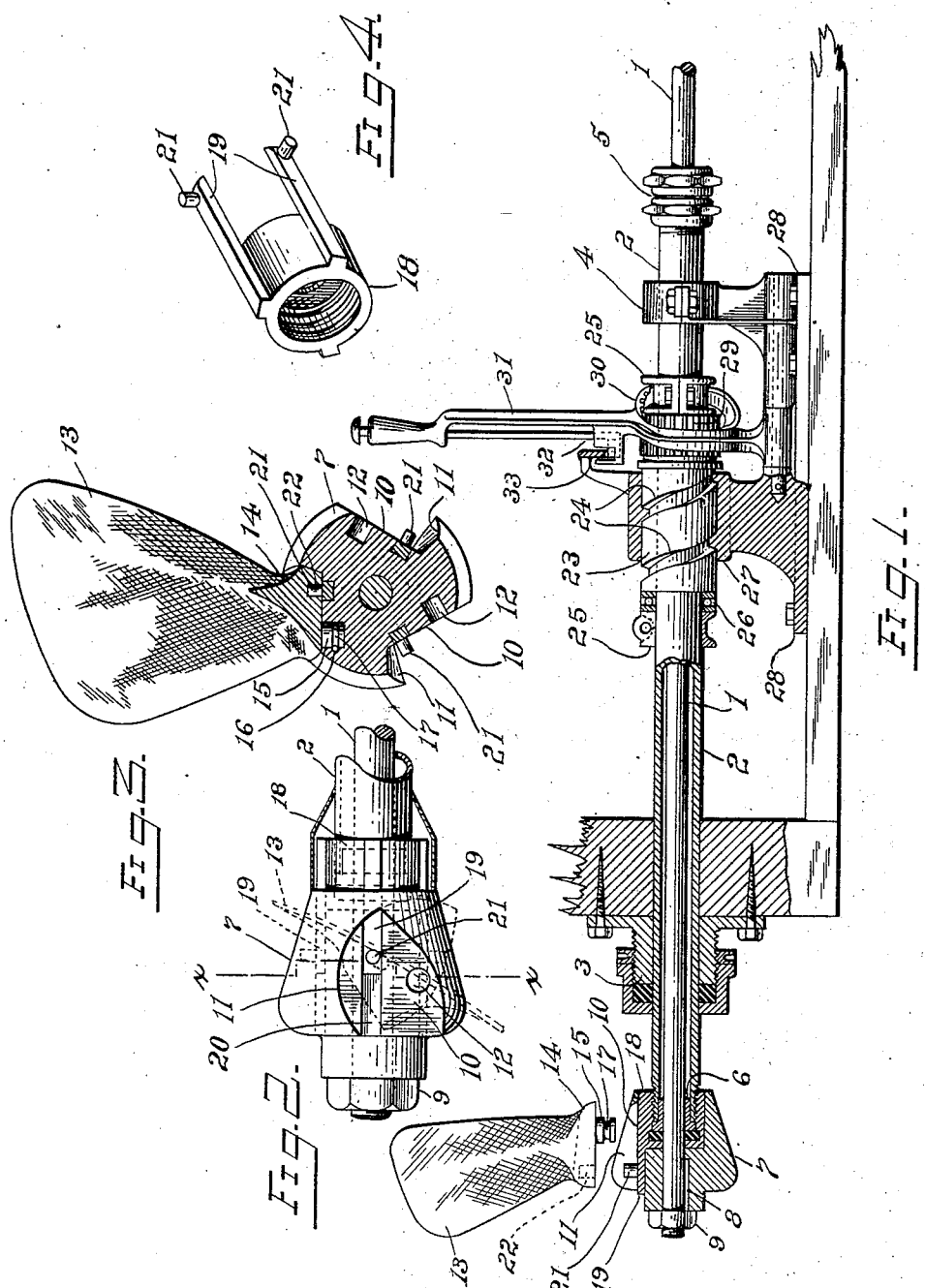
WITNESSES:
Walter A. Greenburg
Anna M. Mayer
INVENTOR
ELLSWORTH S. BRYANT
BY 
ATTORNEYS

UNITED STATES PATENT OFFICE.

ELLSWORTH S. BRYANT, OF DETROIT, MICHIGAN.

REVERSIBLE PROPELLER.

961,285.

Specification of Letters Patent. Patented June 14, 1910.

Application filed May 25, 1908. Serial No. 434,854.

*To all whom it may concern:*

Be it known that I, ELLSWORTH S. BRYANT, a citizen of the United States of America, residing at Detroit, in the county of Wayne and State of Michigan, have invented certain new and useful Improvements in Reversible Propellers, of which the following is a specification, reference being had therein to the accompanying drawings.

This invention relates to screw propellers and more especially to those having reversible blades, together with the controlling mechanism therefor.

The invention consists in the matters hereinafter set forth, and more particularly pointed out in the appended claims.

In the drawings, Figure 1 is a view partially in elevation and partially in section, of a propeller wheel and controlling mechanism, with a blade in position for attachment to the hub. Fig. 2 is a view in detail of the wheel hub, with a blade indicated in dotted lines, in reverse position. Fig. 3 is a view in section on line x—x of Fig. 1 with a blade in forward position. Fig. 4 is a view in detail of a blade coupling.

Referring to the drawings, a propeller shaft 1, together with a sleeve 2 reciprocable thereon, is journaled in a stern post bearing and stuffing-box 3, and a second inboard bearing 4. Preferably a packing gland cap 5 on the inner end and an apertured plug 6 on the outer end form slide bearings for the sleeve on the shaft.

A solid hub 7 is secured to the outboard end of the shaft, as by a key 8 and nut 9 or other suitable means. Broad facets 10 are cut in the hub parallel to the shaft axis, each preferably having a shoulder 11 curved on an arc struck from the center of a pivot socket 12 in the facet. A blade 13 having a shank 14 whose end face corresponds in contour to the facet, is seated on the facet with a pivot stud 15, preferably integral with the blade, locked in the socket 12 by a cross-pin 16 passing through the hub engaging a peripheral groove 17 in the stud 15. A blade coupling collar 18 screw-threaded on or otherwise secured to the outer end of the sleeve 2 and seated, when the sleeve is fully projected, in the inner counterbored end of the hub, has splines 19, integrally formed or secured thereon, each of which is movable in a slot 20 in a hub facet parallel to the shaft. The coupler acts as a retainer for the sleeve plug 6 and packing may be inserted between the plug and coupler, if desired. A stud 21 on each spline engages a slot 22 in the blade. When in forward position, the blade shanks and hub present a smooth, rounded exterior substantially similar to the nave of a solid blade wheel.

A bushing 23 with an exterior helical cam path or screw-thread 24 of quick pitch, is rotatable on the sleeve 2 between longitudinally adjustable stop collars 25, ball bearings 26 being interposed to reduce end thrust friction. The cam or screw-thread interlocks with a mating thread or cam on the interior of a bracket boss or standard 27 of the base frame 28 carrying the inboard bearing 4. A gear 29 on the bushing is engaged by a segmental rack 30 on a reversing lever 31 pivoted on the frame 28 and provided with a latch 32 engaging a quadrant 33. The rack is obliquely arranged to remain in mesh with the bushing gear throughout the range of its movement longitudinally.

In operation, the lever by its rotation of the bushing moves the sleeve and blade coupling longitudinally on the shaft, thereby swinging the blades on their pivots to the desired position.

One of the features of the invention is the solid hub which affords rigid bearing and connection between the shaft and blades and has the usual radial dimensions of a standard fixed-blade propeller.

Another feature is the interlocking of the parts without the use of bolts or nuts, so that the wheel cannot work apart when in use. The coupler is a single piece which cannot become detached and the pivot studs are integral with the blades.

A further advantage is the compactness of the shifting gear, the movement of the lever transversely to the shaft or athwartships also making the gear more convenient for small boats. The blades are positively locked at any desired angle, the lever quadrant being required only for holding the lever against accidental displacement in the usual running positions.

Changes in details of construction may be made without departing from the spirit of the invention, and I do not care to limit myself to any particular form or arrangement of parts.

What I claim as my invention is:—

1. A reversible blade propeller comprising a rotatable main shaft, a hub secured thereto having a solid bearing body, and bearing facets formed in the periphery of the body parallel to the shaft axis, a propeller blade for each facet having a pivot pin extending longitudinally of the blade from the end face of the shank and engaging a socket in the facet, the shanks of the blades and the hub body presenting an unbroken contour of conventional type when the blades are in the normal forward position, a coupler longitudinally reciprocable on the shaft having splines sliding in guide slots in the facets parallel to the shaft each having a stud engaging a groove in the blade transverse to the spline, and means to reciprocate the coupler.

2. A reversible-blade propeller mechanism comprising a rotatable main shaft, a solid hub secured thereto having bearing facets in planes parallel to the shaft axis, a propeller blade pivotally secured on each facet to swing obliquely to the shaft, a coupler adapted to swing the blades in unison, a sleeve non-rotatably and longitudinally reciprocable on the shaft and carrying the coupler, a bushing rotatably secured on the sleeve, a standard having a boss in screw-threaded engagement with the bushing, a gear on the bushing, and a lever swinging on the standard transverse to the shaft provided with a rack in mesh with the gear.

3. A reversible blade propeller mechanism comprising a rotatable main shaft, a solid hub thereon having bearing facets lying in planes parallel to the shaft each provided with a pivot pin socket and a guide slot parallel to the shaft and offset from the socket, a propeller blade for each facet having a shank bearing against the facet with a pivot pin engaging the socket, an annular coupler provided with splines each sliding in a facet guide slot and movably engaging the blade, a sleeve non-rotatably and longitudinally reciprocable on the shaft and carrying the coupler, a bushing rotatably secured on the sleeve, a standard having a boss in screw-threaded engagement with the bushing, a gear on the bushing, and a lever swinging on the standard transverse to the shaft provided with a rack in mesh with the gear.

4. A reversible-blade propeller comprising a rotatable main shaft, a hub secured thereto having a solid bearing body, and bearing facets formed in the periphery of the body parallel to the shaft axis, a propeller blade for each facet having a pivot pin extending longitudinally of the blade from the end face of the shank and engaging a socket in the facet, the shanks of the blades and the hub body presenting an unbroken contour of conventional type when the blades are in the normal forward position, a coupler having splines sliding in guide slots in the facets parallel to the shaft each having a stud engaging a groove in the blade transverse to the spline, and a sleeve nonrotatably and longitudinally reciprocable on the shaft and carrying the coupler, a bushing rotatably secured on the sleeve, a standard having a boss in screw-threaded engagement with the bushing, a gear on the bushing, and a lever swinging on the standard transverse to the shaft provided with a rack in mesh with the gear.

5. The combination with a bearing of a rotatable main shaft passing therethrough, a solid hub secured thereto having bearing facets in planes parallel to the shaft axis, a propeller blade pivotally secured on each facet to swing obliquely to the shaft, a coupler, a sleeve longitudinally reciprocable and rotatable in the bearing and longitudinally reciprocable on the shaft and carrying the coupler, a bushing rotatably secured on the sleeve, a standard having a boss in screw-threaded engagement with the bushing, a gear on the bushing, and a lever swinging on the standard transverse to the shaft and provided with a rack in mesh with the gear.

In testimony whereof I affix my signature in presence of two witnesses.

ELLSWORTH S. BRYANT.

Witnesses:
C. R. STICKNEY,
OTTO F. BARTHEL.